United States Patent [19]

Lindsey et al.

[11] 4,247,084
[45] Jan. 27, 1981

[54] STRINGING BLOCK THREADING APPARATUS

[76] Inventors: Keith E. Lindsey, 932 Flanders Rd., La Canada, Calif. 91011; L. E. Lindsey, 2262 E. Mountain St., Pasadena, Calif. 91104

[21] Appl. No.: 3,408

[22] Filed: Jan. 15, 1979

[51] Int. Cl.³ ............................................. B66D 1/36
[52] U.S. Cl. ........................... 254/134.3 PA; 403/300; 403/322
[58] Field of Search ............... 254/134.3 PA, 134.3 R; 403/303, 300, 322

[56] References Cited

U.S. PATENT DOCUMENTS

| | | | |
|---|---|---|---|
| 3,530,548 | 9/1970 | Gearin | 403/300 |
| 3,861,814 | 1/1975 | Fisher | 403/300 |
| 4,006,884 | 2/1977 | Lederhos et al. | 254/134.3 PA |
| 4,032,240 | 6/1977 | Reinhardt et al. | 403/322 |

FOREIGN PATENT DOCUMENTS

2735002  2/1978  Fed. Rep. of Germany ........... 403/322

Primary Examiner—Robert C. Watson
Attorney, Agent, or Firm—Sellers and Brace

[57] ABSTRACT

Stringing block threading apparatus for use in uncoupling a junction in a conductor hauling line and inserting a threading loop therein previously assembled through the throat of a stringing block. The hauling line is advanced along power line towers by a helicopter and the advance sections of this line are separably joined by a double ended coupling. This coupling is deposited into the threading apparatus atop each tower where it is automatically disconnected from the hauling line allowing enlargements on the released section ends to separate and become trapped in respective mating couplings at the opposite ends of the threading loop and the leading one of which is of the same double ended construction as the one deposited in the threading apparatus by helicopter. This coupling is deposited in the next threading apparatus for a repeat threading operation.

41 Claims, 13 Drawing Figures

STRINGING BLOCK THREADING APPARATUS

This invention relates to stringing block threading apparatus, and more particularly to unique apparatus for automatically disconnecting a conductor hauling line coupling from the line and automatically substituting a threading loop as a helicopter advances the hauling line from tower to tower along a power line.

BACKGROUND OF THE INVENTION

Until relatively recent times it has been the practice when installing conductors in cross country power lines to hand thread the stringing blocks with a light line. The stringing blocks are suspended from conductor insulators mounted on the supporting towers and it has been necessary for workmen to mount the towers and thread the light line through the throat of each stringing block after which this line is employed to pull in a high strength conductor hauling cable. This initial hand threading operation has been costly, time consuming and hazardous. Later proposals have been made for stringing blocks having slotted frames permitting the hauling line to be advanced along the power line by aerial transport and lowered into the stringing block throat through the frame slot. Patents disclosing such techniques include U.S. Pat. Nos. to Bozeman 4,018,422, and Chadwick 3,905,581. These threading techniques are feasible only if the stringing block is supported outside one side of the tower. However, this limitation has been circumvented by Lederhos et al 4,006,884 wherein there is provided a stringing block threading apparatus utilizing a short length of line known as a threading loop. One of these loops is preassembled through the throat of each stringing block with its ends releasably supported in apparatus located above the tower and operable to uncouple a hauling line connector from an aerially delivered line and substituting the threading loop between the uncoupled ends of the hauling line. The present invention is closely related to the operating principles of the Lederhos et al teachings but incorporates important improvements and certain modified operating principles disclosed hereinbelow.

SUMMARY OF THE INVENTION

The present invention provides an improved foolproof threading apparatus for stringing blocks suspended from insulators located inwardly of the sides of power line towers. The apparatus utilises a threading loop equipped at its ends with coupling means arranged to be releasably supported at the opposite ends of the threading apparatus. The coupling at the trailing end of the threading loop is designed for positive interlocking engagement with the hauling line and the leading end of the threading loop is equipped with the same type of double ended connector employed to separably interconnect the advance sections of the conductor hauling line. This leading coupling is so designed and arranged as to be disconnected from the hauling line and retaine captive in the threading apparatus mounted on the next tower to be serviced. The double ended coupling is equipped with separate detents for each of its ends and constructed and arranged for release in time delayed sequence.

Accordingly, it is a primary object of this invention to provide improved apparatus for automatically threading a stringing block with an aerially transported conductor hauling line while the threading block is suspended between the sides of a power line tower.

Another object of the invention is the provision of an improved apparatus for automatically substituting a stringing block threading loop for a coupling interconnecting the leading sections of a conductor hauling line.

Another object of the invention is the provision of stringing block threading apparatus securable to the top of a power line tower and operable to uncouple a hauling line coupling and substitute therefor a threading loop pre-assembled through the throat of a stringing block.

Another object of the invention is the provision of a novel stringing block threading loop with novel coupling components at the ends thereof.

Another object of the invention is the provision of stringing block threading apparatus securable to a power line tower and operable to thread a conductor hauling line through the throat of a stringing block located therebelow and between the opposite sides of the tower.

Another object of the invention is the provision of an improved coupling for detachably inter-connecting two sections of a hauling line.

Another object of the invention is the provision of a double-ended line coupling having separate detents for each end with means for operating the same sequentially.

These and other more specific objects will appear upon reading the following specification and claims and upon considering in connection therewith the attached drawing to which they relate.

Referring now to the drawing in which a preferred embodiment of the invention is illustrated.

FIRST PREFERRED EMBODIMENT

Figure 1:
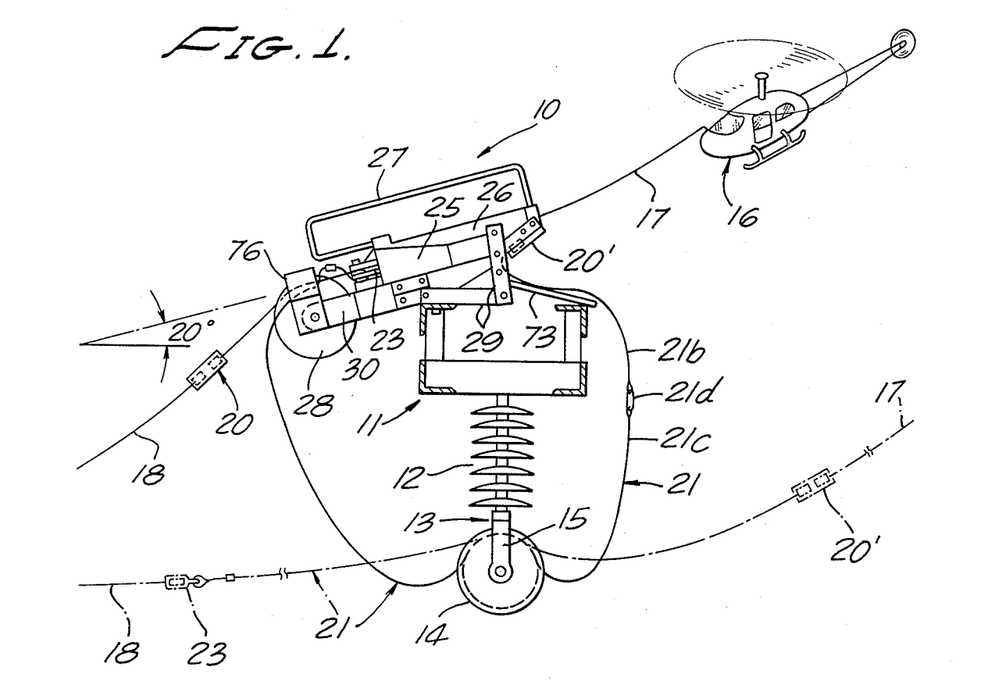
FIG. 1 is an elevational view, partly in cross section, showing an illustrative embodiment of the invention secured to the top of a power line tower as an aerially transported hauling line advances a coupling interconnecting advance sections of the line into the apparatus and including a dot and dash line showing of the hauling line with a threading loop substituted for the coupling.
Figure 2:
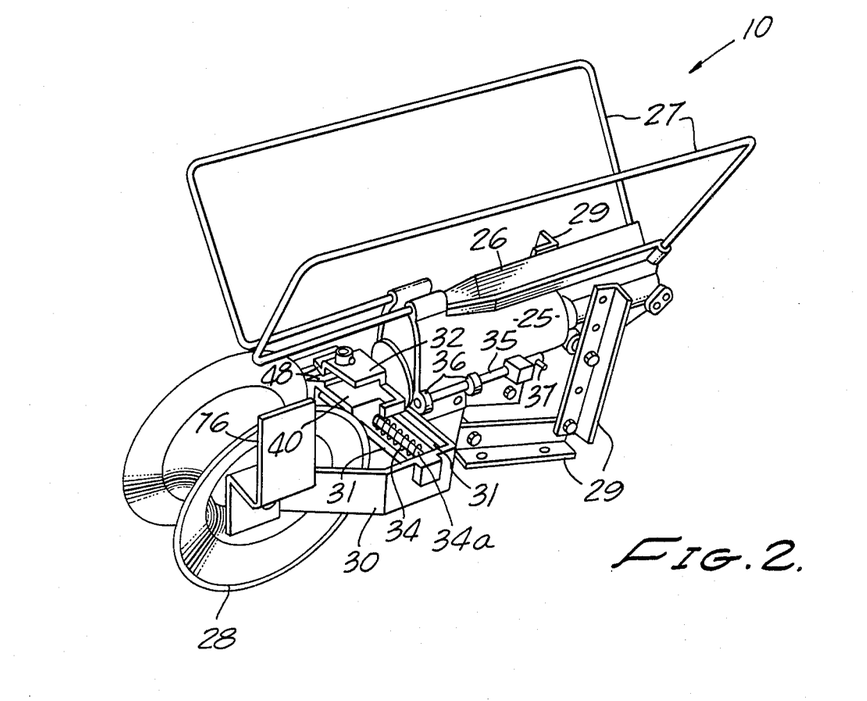
FIG. 2 is a perspective view of the threading apparatus per se on an enlarged scale.

Referring initially more particularly to FIGS. 1 and 2, the invention stringing block threading apparatus, designated generally 10, is shown firmly but releasably secured to the cross beam structure 11 at the top of a power line tower. Typically, apparatus 10 is secured crosswise of the mid-length of cross beam 11 and directly overlying a power line insulator 12. Suitably detachably connected in known manner to the lower end of insulator 12 is a stringing block 13 such as that shown in the U.S. Pat. No. to Lindsey 3,199,840. As is well known, such blocks have a plurality of sheaves 14 rotatably supported by an inverted U-shaped frame 15.

FIG. 1 shows an aerial transport, such as a helicopter 16, advancing to the right along a power line pulling a conductor hauling line having a leading section 17 attached to the transport and detachably connected to a tailing section 18 of the hauling line by a double ended coupling or disconnect 20. The leading line section 17 has been dropped into the upwardly opening slot of apparatus 10 in readiness to pull disconnect 20 into the apparatus where the disconnect is automatically detached and retained captive as the adjacent ends of line sections 17 and 18 separate and become recoupled to the opposite ends of a threading loop 21. Threading loop 21 has been previously hand-threaded through the throat of stringing block 13 and its opposite ends have been releasably secured at the opposite ends of apparatus 10 in position to capture and become coupled to the enlarged ends of line sections 17 and 18. These details will be described in detail below. Coupling 20′, detachably coupled to the leading end of threading loop 21, is identical in construction with disconnect 20, whereas the trailing end of threading loop 21 is provided with a specially constructed female coupling 23. The latter is best shown in FIGS. 3, 8 and 9, and will be described in greater detail presently.

Preferably threading loop 21 includes a short length of flexible cable 21b (FIG. 1) having a cylindrical enlargement 21a (FIG. 4) at its leading end and a loop or an elongated ring 21d at its other end (FIG. 1). This ring is attached to a long rope or the like 21c (FIG. 1) which passes through the throat of the stringing block 13, the trailing end of the rope being anchored to eyelet 50 of the female coupling 23 as shown in FIG. 3. Rope 21c is readily selected or tailored to an appropriate length for use with a particular size tower, insulator and stringing block installation. The short length of cable 21b can be reused repeatedly and readily withstands the severe stresses to which the threading loop may be subjected in normal use.

Figures 3, 8, 9:
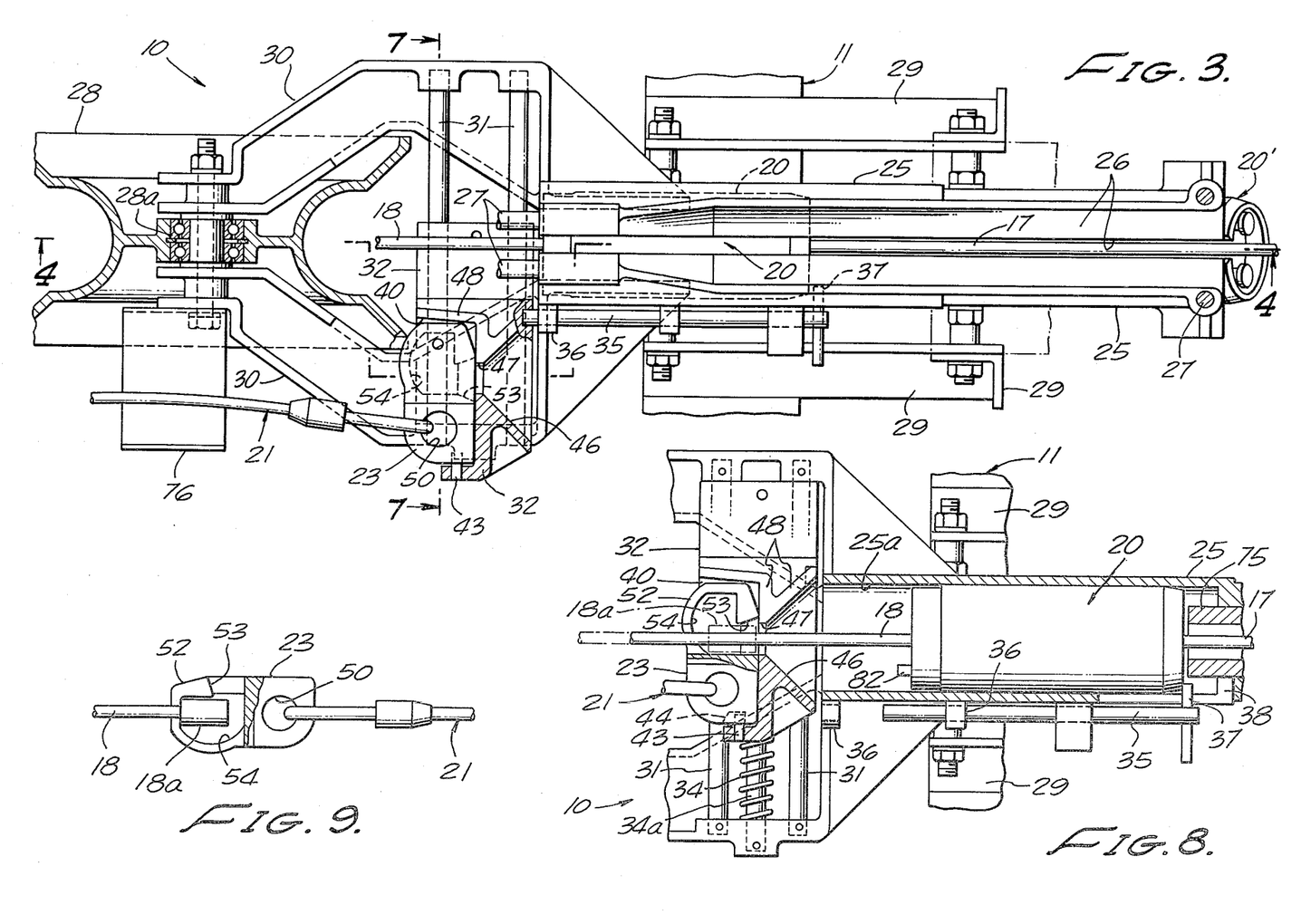
FIG. 3 is a top plan view of the threading apparatus on an enlarged scale with parts broken away and showing the position of the parts when the couplings of a threading loop are supported adjacent the opposite ends of the apparatus in readiness for insertion in a hauling line in lieu of a coupling.
FIG. 8 is a fragmentary cross-sectional view similar to FIG. 3 but showing the movable support for the rear threading line coupler positioned to receive and interlock with the trailing section of the hauling line.
FIG. 9 is a top plan view of the coupling at the trailing end of the threading loop with the rear top half of the coupling broken away to show the trailing section of the hauling line captively coupled thereto.

As best shown in FIGS. 2 and 3, apparatus 10 has a generally open-ended tubular passage 25a having an upwardly flaring slot 26 formed in part by the upwardly flaring guard rods 27 which aid in guiding the leading section 17 of the hauling line into the apparatus. While this operation is taking place, helicopter 16 moves to the right as viewed in FIG. 1 thereby advancing coupling 20 over roller 28 and into the rear end of tubular passage 25a.

Apparatus 10 is secured to the tower cross beam 11 by pairs of angle iron brackets 29 secured along the opposite sides of the main body. The generally vertical one of these brackets has a series of holes for use in supporting in main body 25 with passage 25a inclined upwardly and forwardly at a suitable angle to the horizontal as, for example, 20°. This angle may vary widely depending upon operation conditions.

The hauling line roller 28 serving to guide coupling 20 into the apparatus is best shown in FIG. 3 and is supported on an anti-friction bearing 28a between the legs of a U-shaped bracket 30 projecting outwardly from the rear end of main body 25.

Extending crosswise between the legs of bracket 30 are a pair of parallel rods 31 providing a sliding support for a carriage 32 (FIGS. 2, 3, 4, 7 and 8) in which the female coupling 23 at the trailing end of the threading loop 21 is releasably supported. A compression spring 34 loosely embracing a pin 34a fixed to bracket 30 between rods 31 normally urges carriage 32 to its extended position shown in FIGS. 2 and 8. However, carriage 32 can be locked in its retracted position by a latch 35 (FIG. 3) slidably supported in brackets 36 protruding from main body 25 (FIGS. 3, 8). The right hand end of latch 35 is provided with a pin 37 extending through a slot 38 in the sidewall of the main body 25 into the path of the double ended coupling or disconnect 20 while this coupling is travelling forwardly along passage 25a. When latch 35 is released, spring 34 shifts carriage 32 quickly to its extended position to support the female coupling at 23 at the trailing end of the threading loop 21 in position to receive and become coupled to the enlargement 18a at the forward end of hauling line section 18. From the foregoing it will be understood that when carriage 32 is in its retracted position the rear end of tubular passage 25a is unobstructed and freely open to receive the hauling line and coupling 20, whereas, when the carriage is in its extended position, it supports coupling 23 in a proper position for coupling to hauling line section 18 as will be described in greater detail presently.

Figures 6, 7:
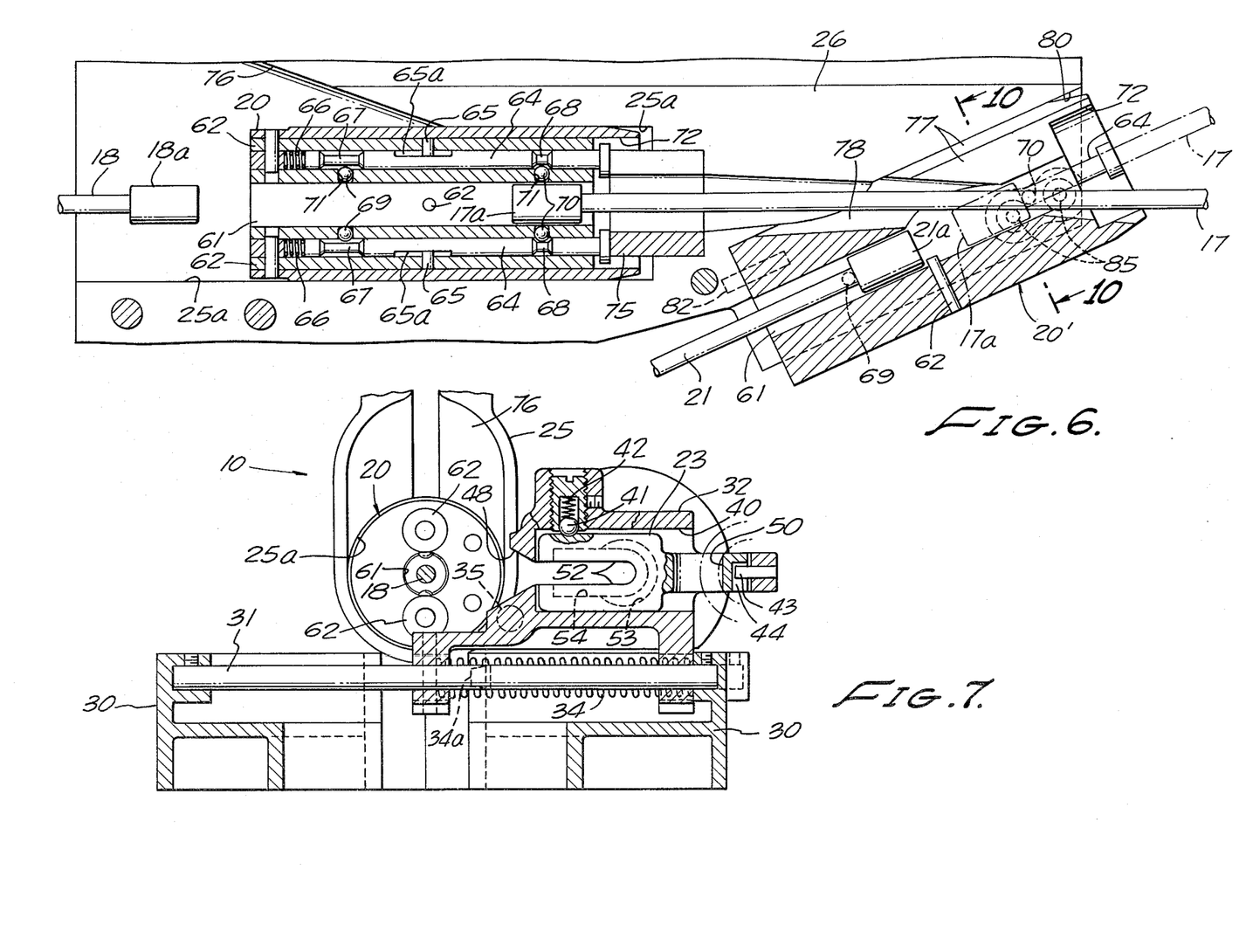
FIG. 6 is a fragmentary cross sectional view through the forward end of the apparatus shown in FIG. 4 with both ends of the hauling line released with the leading section of the hauling line advancing toward coupling engagement with the coupling attached to the leading end of the threading loop.
FIG. 7 is a fragmentary cross sectional view on a slightly enlarged scale taken along line 7—7 on FIG. 3.

Carriage 32 slidable crosswise of the rear or entrance end of the tubular passage 25a will now be described with reference to FIGS. 2, 3, 4, 7 and 8. As shown in FIG. 2, the carriage is in its extended position across the entrance of passage 25a with threading line coupling 23 detached whereas the remaining figures just referred to show the carriage locked in its retracted position by latch 35 and with coupling 23 held captive in a rearwardly opening seating pocket by ball detent 41 and spring 42 (FIG. 7). Cooperating with ball detent 41 for this purpose is a pin 43 carried in one end wall of pocket 40 and extending into a well 44 at the end of coupling 23 remote from the ball detent (FIGS. 7, 8). As is best shown in FIGS. 2, 3 and 8, carriage 32 is provided with a conical recess 46 the smaller end of which opens at 47 into pocket 40 and the larger end of which covers and is in alignment with the entrance end of the tubular passage 25a when the carriage is in its extended position. The conical recess 46 provides a piloting guide surface to guide the enlarged end 18a of a hauling line section 18 into opening 47 preliminary to recoupling enlargement 18a with coupling 23 of the stringing loop 21.

The upper end half of carriage 32 as viewed in FIG. 8 is deeply slotted horizontally to freely receive the trailing section 18 of the hauling line after coupling 20 has been pulled into the threading apparatus 10. As the coupling moves forwardly therein, it engages pin 37 and retracts latch 35 so that spring 34 snaps carriage 32 to its extended position with hauling line 18 positioned in opening 47 and slot 48. FIG. 7 shows the hauling line 18 after it has entered the rear end of the threaded apparatus and before carriage 32 is released, whereas FIG. 8 shows the carriage released and moved crosswise of the hauling line.

Coupling 23 on the trailing end of threading loop 21 shown in FIGS. 3 and 7 to 9, as a one piece elongated main body provided with an opening 50 at one end to which the threading loop 21 is loosely fixed. The left hand end of coupling 23 has a slot 52 extending for one half its length. The width of the slot is greater than the diameter of hauling line 18 so that the latter is freely movable along the slot. One end of slot 52 terminates in the circular opening 53 sized to freely pass the enlarged end 18a of the hauling line. Slot 52 and opening 53 open into a socket or female cavity 54 freely receiving enlargement 18a and permitting this enlargement to rotate through 90° from the position shown in FIG. 8 to the position shown in FIG. 9 wherein it is held firmly captive with its axis in alignment with threading loop 21 as clearly shown in FIG. 9.

As will be evident from FIG. 8, the entrance of the enlargement 18a into cavity 54 causes that end of coupling 23 to be dislodged from ball detent 41 and to pivot counter-clockwise out of engagement with retaining pin 43. As this occurs, coupling 23 rotates counterclockwise through 90° to the position shown in FIG. 9 with the trailing end of the threading loop 21 captively coupled to the leading end of section 18 of the hauling line.

Figures 4, 5, 10:
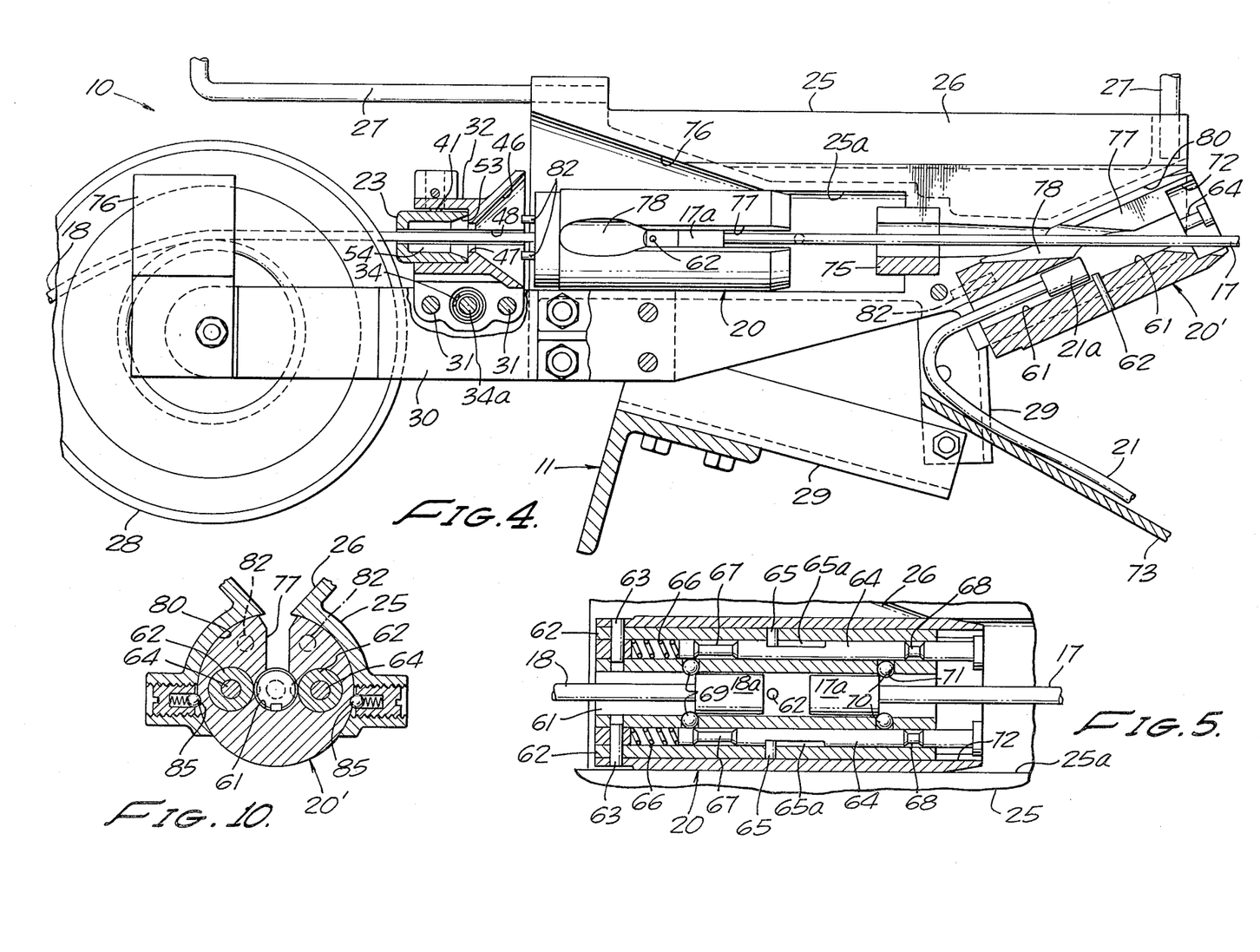
FIG. 4 is a cross sectional view taken along the broken line 4—4 on FIG. 3.
FIG. 5 is a fragmentary longitudinal sectional view through a double ended coupling showing details of the sequentially releasable detents in locked position.
FIG. 10 is a cross sectional view along line 10—10 on FIG. 6 showing means for releasably supporting the coupling at the leading end of the threading loop in readiness for coupling engagement with the leading section of the hauling line.

The double disconnect or coupling 20 will now be described with particular reference to FIGS. 4-8. It will be understood that couplings 20 and 20' are identical in construction and, in consequence, only one need be described FIGS. 4 and 6 show coupling 20 in use to interconnect the two contiguous or leading sections 17, 18 of the hauling line. FIGS. 4 and 8 show coupling 20' attached to enlargement 21a on the leading end of stringing loop 21 and releasably supported inclined crosswise of the forward end of tubular passage 25a of the threading apparatus.

Referring now principally to FIGS. 5 and 10, coupling 20 is shown as having a thick walled tubular main body provided with longitudinal bores disposed to either lateral side of the central open-ended passage 61 closed at one end by plugs 62 and held assembled by pins 63. Separate detent actuator pins 64 are freely reciprocable within tubes 62 between the limits permitted by elongated notches 65a and stop pins 65. Compression springs 66 bearing against the inner ends of actuators 64 normally hold these actuators extended to the positions shown in FIG. 5. Each actuator is provided with a pair of annular grooves 67, 68 having flaring sidewalls. Each of these grooves is associated with a ball detent 69 and 70 freely movable in radial passages 71 through the wall of tubes 62, the length of passages 71 being substantially less than the diameter of balls 69 and 70 and the inner ends of the passages 71 being slightly restricted to prevent the escape of the detent balls into passage 61. When the actuator pins 64 are in their normal extended position as shown in FIG. 5, the detent balls 69 and 70 are held positively in their inwardly extended positions wherein they are effective to lock the enlargements 17a, 18a of the hauling line sections 17 and 18 against withdrawal from coupling 20. However, when the actuator pins 64 are pressed inwardly until one or both of the grooves 67 and 68 are opposite the adjacent ends of passages 68 and 70, the detent balls are free to move outwardly and release one or both of the enlargements 17a, 18a. Groove 67 is wider than groove 68 and these grooves are so positioned axially of one another that relatively slight leftward movement of actuator pins 64, as viewed in FIG. 5, suffices to permit balls 69 to move inwardly and release enlargement 18a whereas enlargement 17a and the leading section 17 of the hauling line remains positively locked against withdrawal. In consequence, it is necessary that both of the actuator pins 54 be shifted further to the left before balls 70 will permit the withdrawal of enlargement 17a. It will therefore be seen that the two enlargements are normally released in time-delayed sequence. It will be understood that the order of release can be reversed, if so desired.

The forward end of coupling 20 is provided with a well 72 the sidewall of which provides a protective shroud for the enlarged forward ends of actuator pins 64. The ends of these pins terminate generally flush with the lip of a well 72. The actuator pins 64 are driven rearwardly to release the ball detents 69, 70 when the actuator pins 64 engage a slotted ring stop 75 (FIG. 4) located near the forward end of the tubular passage 25a through the main body 25 of the apparatus.

Referring to FIG. 4, it will be noted that the upwardly facing side of couplings 20 and 20' is provided with a key-hole slot comprising a rearwardly inclined passage 77 large enough to accept enlargement 17a of the hauling line and a radially disposed slot 77 large enough to freely accommodate the hauling line. Slot 77 extends from the enlarged portion 78 throughout the remaining forward end of the coupling.

The disconnect or coupling 20' shown coupled to the leading end of threading loop 21 is releasably held assembled across the forward end of the passage 25a of the threading apparatus in the manner shown in FIG. 4 as will now be described. For this purpose, the forward end of the apparatus is formed with a cylindrical socket 80 (FIGS. 4 and 10) which is inclined upwardly and forwardly across the passage 25a. When coupling 20' is properly seated in well 80 portion 78 of its keyhole slot is axially aligned with the tubular passage 25a. Locator pins 82,82 projecting from the rear end of coupling 20' seat in sockets formed in the bottom of well 80 when the slot 77 is in vertical alignment with slot 26 of the threading apparatus. Accordingly the leading section 17 of the hauling line is free to drop through slot 26 and through slot 77 into coupling 20' as the helicopter drops the hauling line into the apparatus. Further assurance against the likelihood of premature dislodgement of coupling 20' from well 80, is provided as shown in FIG. 10 by one or two pairs of spring pressed ball detents 85, 85, which seat in depressions in the opposite sidewalls of coupling 20' when it is properly and fully seated in well 80. These ball detents release the coupling as the helicopter places tension on hauling line 17 and pulls it upwardly and axially forwardly out of well 80 after its enlargement 17a enters the keyhole passage and becomes locked to coupling 20 by detent balls 70. (FIG. 5).

SECOND PREFERRED EMBODIMENT

Figure 11:
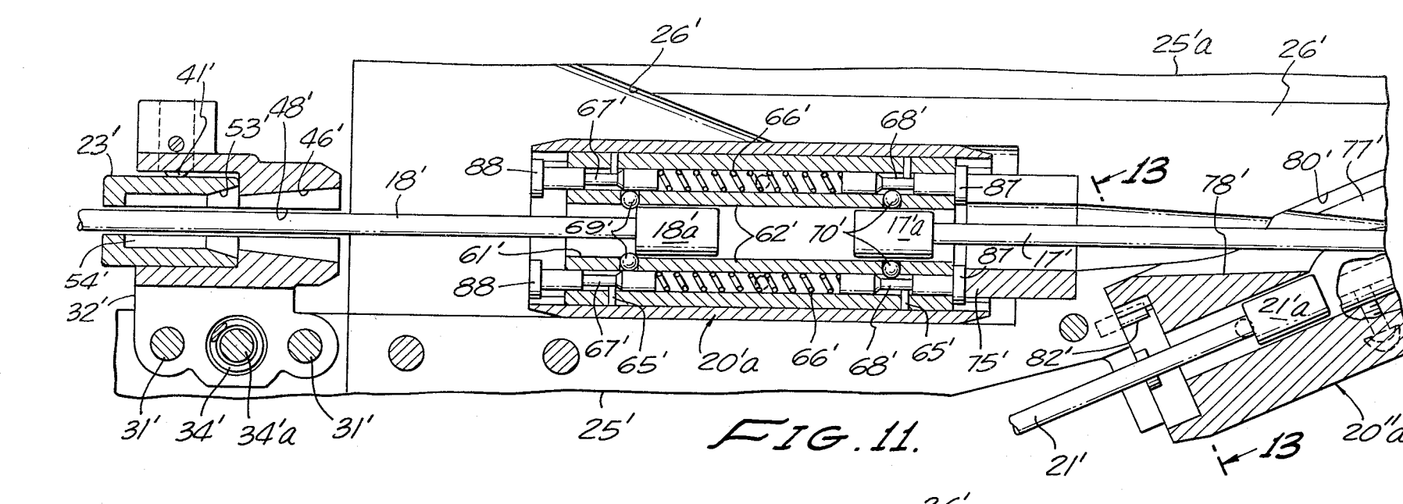
FIG. 11 is a fragmentary longitudinal sectional view of a second preferred embodiment employing a modified double ended coupling while in the process of releasing the leading end of the threading loop.
Figure 12:
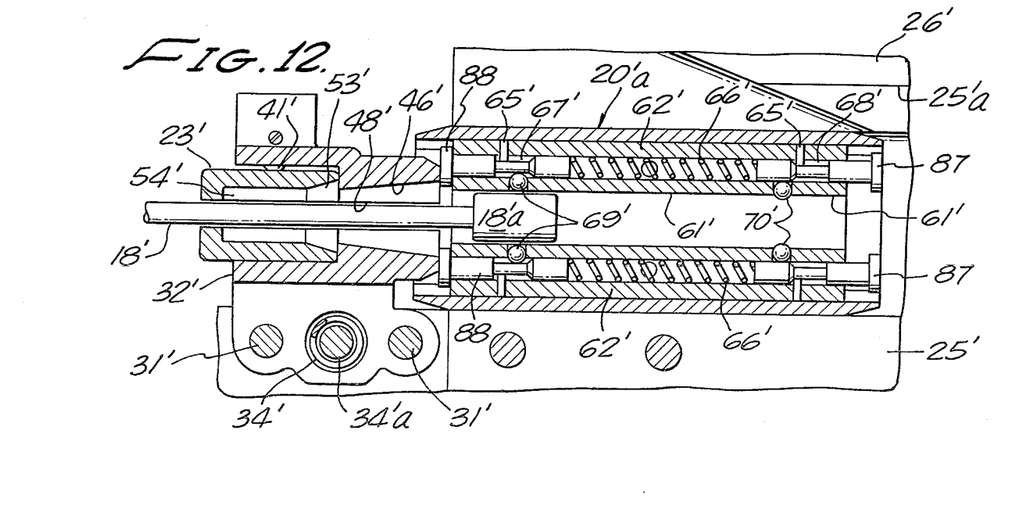
FIG. 12 is a fragmentary cross sectional view showing the coupling shifted rearwardly and releasing the trailing end of the threading loop.
Figure 13:
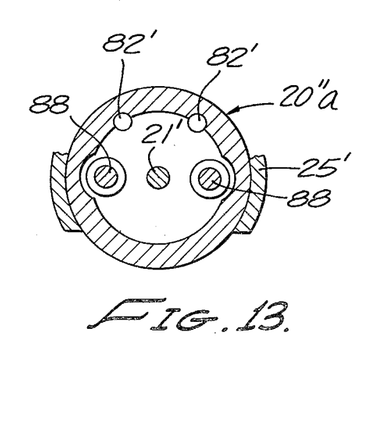
FIG. 13 is a fragmentary cross sectional view taken along line 13—13 on FIG. 11.

Referring now to FIGS. 11 to 13, a second preferred embodiment of the invention will be described. In general, the same reference characters will be employed in describing the same or similar components of the second embodiment as were used in describing FIGS. 1 to 10 but are distinguished therefrom by the addition of a prime or a double prime. In addition, the double end couplings are designated 20'a and 20"a. The second embodiment differs essentially in that the double ended coupling 20'a has separate pairs of detent actuators at its opposite ends, the forward pair 87, 87 being shifted to their release position when pulled forwardly into contact with the slotted ring stop 75' and the rear pair 88,88 being shifted to their release position when coupling 20'a is pulled rearwardly as shown in FIG. 12.

Coupling 20'a is constructed generally similarly to coupling 20 except that the opposite ends of tubes 61' are equipped with separate detent actuators, namely one pair 87, 87 at the forward end and a second pair 88, 88 at the rearward end. These actuators are spring biased by springs 66' away from one another and to their respective extended positions against stop pins 65' extending into grooves 67', 68'. Normally actuators 87, 88 are held in their extended positions by springs 66' thereby locking the detent balls 69', 70' in their inwardly extended positions. However, when the actuators are pressed axially inwardly, detent balls 69', 70' are free to move outwardly into grooves 67' or 68' thereby allowing the enlargements 17'a and 18'a of the hauling line sections 17' or 18' to enter or to escape from the central open-ended passageway 61' of coupling 20'a.

From the foregoing it will be recognised that the hauling line enlargements 17'a and 18'a at either end of the coupling can be released only by inward reciprocation of the associated pair of actuators 87 or 88. Since the release movement of each pair of actuators must occur in the opposite direction, it is clear that the forward pair 87 must be actuated by forward movement of coupling 20'a whereas the release of the rear pair 88 can occur only during rearward travel of coupling 20'a. The time delay involved in this reverse movement of the coupling in passageway 25'a of the threading apparatus enables the enlargement 17'a and the leading section 17' of the hauling line to become coupled to coupling 20"a attached to the leading end of threading loop 21' before enlargement 81'a becomes coupled to coupling 23' at the trailing end of the threading loop 21'. By this expedient the helicopter is enabled to substantially remove most of the slack in the threading loop while the enlargement 18'a of the trailing hauling line section 18' is being coupled to the trailing end of the threading loop and disengaged from carriage 32'.

OPERATION OF FIRST EMBODIMENT

In use, one of the described threading apparatuses 10 will be securely anchored crosswise of the cross beam 11 above the top of each tower of the power line along which the power conductors are to be strung. The apparatus is secured to crossbeam 11 by suitable bolts and the bracket arms 29 are adjusted to support the tubular passage, 25a along which the coupling 20 is to be drawn at a suitable angle. Typically, passage 25a is inclined upwardly and forwardly at an angle of about 20° as is indicated to the left of FIG. 1. When so installed apparatus 10 directly overlies a multiple sheave stringing block 13 suspended from the lower end of a power line insulator 12 located below cross beam 11 and between the legs of the tower. A threading loop 21 is then passed through the throat of the stringing block with the coupling 20' at the leading end of the stringing line 21 properly seated in well 80 of the stringing apparatus. When so installed locator pins 82 are seated in the recesses therefor at the bottom of well 80 and ball detents 85 (FIG. 10) are seated in recesses on the opposite sides of coupling 20'. It will also be understood that the forward enlargement 21a of the threading loop is installed in and locked in place in passage 61 by detent balls 69. It is also pointed out that a slide board 73 (FIGS. 1 and 4) is preferably assembled to the tower cross beam 11 and underlying coupling 20'. The purpose of slide board 73 is to avoid any possibility of coupling 20' becoming entangled with the cross beam during its release from the threading apparatus as the helicopter moves forwardly.

Coupling 23 fixed to the trailing end of threading loop 21 is also inserted in pocket 40 of carriage 32 and latched there by pin 43 and ball detent 41 (FIG. 7) with its inlet opening 53 aligned with opening 47 of the carriage. The adjacent portion of threading loop 21 is laid across the top of bracket 75 (FIGS. 2 and 3). Either before or at this time, carriage 32 is manually shifted to its retracted position shown in FIG. 3 and latched there by latch 35. In this position, carriage 32 is out of the path of the hauling line and particularly coupling 20 as the latter rides up over roller 28 and into the inlet end of the tubular passage 25a. The inlet end of this passage flares rearwardly and upwardly as indicated at 76 in FIG. 4 and serves to guide and deflect the bevelled forward end of the coupling into the tubular passage 25a as it enters the threading apparatus.

After each tower along the line has been similarly equipped with its own threading apparatus 10, the helicopter pilot begins to fly along the power line towing the hauling line. Usually he chooses to advance tail first past each threading apparatus in the manner illustrated in FIG. 1 as this provides him with a clear view of the leading section 17 of the hauling line. He manoeuvres his craft so as to drop this leading section between the upwardly flaring guard rods 27 which then falls through slot 26 into the tubular passage 25a. The leading coupling 20 is then slightly behind the rear end of threading apparatus. As the pilot manoeuvres the craft forwardly, coupling 20 is advanced over the guide roller 28, past carriage 32 and into the throat 76 of the tubular passage 25a. As the coupling 20 moves forwardly its bevelled nose contacts pin 37 of latch 35 (FIG. 3) and pulls this latch forwardly disengaging it from carriage 32. Thereupon spring 34 (FIG. 8) shifts carriage 32 crosswise of the rear end of the coupling as section 18 of the hauling line enters slot 48 of carriage 32 and slot 52 of the threading loop coupling 23.

As coupling 20 advances along passage 25a actuators 64 engage stop 75 (FIG. 6) shifting actuator 64 to the left until detent balls 69 are free to move into the associated groove 67 (FIG. 5). Accordingly and as there shown, the enlargement 18a at the forward end of hauling line section 18 is released first and enlargement 17a at the end of section 17 is released a short interval later as balls 70 move outwardly into groove 68. The two enlargements 17a, 18a are now free to move apart and outwardly through the opposite ends of passage 61.

Enlargement 18a is guided by conical recess 46 of carriage 32 into outlet opening 47 and through opening 53 of coupling 23 into cavity 54 of the latter, an operation made clear by FIGS. 8 and 9. As enlargement 18a engages the left hand wall of cavity 54 it pivots coupling 52 out of pocket 40 and into the interlocked condition or mode illustrated in FIG. 9.

Enlargement 17a on the leading section 17 of the hauling line moves forwardly and into the inclined passage 78 of the keyhole slot in coupling 20' and forwardly along the axial passage 61 where it is trapped by ball detents 70 and the forwardly extended actuator pins 64, 64. As the helicopter applies tension to the hauling line, coupling 20' is pulled forwardly out of well 80 of the threading apparatus with threading loop 21 forming a link of the main hauling line and threaded through the throat of stringing block 13. The pilot now pulls the line forwardly to the next tower and repeats the threading operation by depositing coupling 20' in the threading apparatus at that tower and substituting therefor another threading loop in the same manner just described.

While this operation is proceeding the crew stationed at the starting point proceeds to unreel hauling line as needed. It is found in practice that the weight of the line between towers causes it to sag and applies a major part of the tension required to maintain a sag loop between successive towers. Accordingly, the aircraft need apply only sufficient tension in the line to remove a portion of the sag between the last two towers. For this reason a tension of only a few hundred pounds easily supplied by the aircraft need be applied to the line whether it is near or distant from the starting point of the threading operation. Accordingly several miles of the line may be threaded in a single continuous flight operation.

OPERATION OF SECOND EMBODIMENT

The operation of the second preferred embodiment illustrated in FIGS. 11 to 13 is similar to that described for FIGS. 1 to 10, except that the modified coupling 20'a must travel to the forward end and then to rear end of the central passageway 25'a of the threading apparatus to release the respective ends of hauling line sections 17', 18'. The helicopter pilot guides the hauling line into apparatus 25' in the same manner described above and advances coupling 20'a along passageway 25'a. As the disconnector approaches the split ring stop 75', detent actuators 87, 87 are shifted rearwardly to the position shown in FIG. 1 thereby permitting the detent balls 70' to move outwardly into grooves 68' releasing the enlargement 17'a of the leading section 17' of the hauling line. Enlargement 17'a then travels forwardly and enters the passageway 78' of coupling 20"a where it is held captive in the same manner described above in connection with FIGS. 1 to 10. Coupling 20"a is now positively locked to the leading end of threading loop 21' and the tension present in the leading section 17' of the hauling line acts to withdraw coupling 20"a axially out of its seating engagement at the forward end of the threading apparatus 25'.

Immediately enlargement 17'a is released from coupling 20'a the tension present in the trailing section 18' of the hauling line pulls coupling 20'a rearwardly along passage 25'a until detent actuators 88, 88 contact the stop at the forward and larger end of the conical surface 46' of carriage 32'. This reciprocates the actuators 88 inwardly allowing detent ball 69' to move outwardly into grooves 67' thereby releasing enlargement 18'a which withdraws to the left and becomes trapped and interlocked in cavity 54' of coupling 23' at the trailing end of threading loop 21'. In this connection it will be understood that coupling 23' is identical with coupling 23 shown permanently attached to the trailing end of the threading loop 21 in FIG. 9. The tension present in the hauling line 18' by virtue of its weight disengages coupling 23' from carriage 32' whereupon the helicopter assumes these load forces and advances the hauling line through the throat of stringing block, not shown, but understood as suspended from an insulator in the manner shown in FIG. 1. It will be understood that carriage 32' is constructed in the same manner as described in FIGS. 1 to 10 except for the modification of the stop provided at the leading larger end of the conical surface 46'. At the time coupling 20'a enters the threading apparatus this carriage is latched in its retracted position as shown in FIG. 7 but is released as the coupling moves forwardly along passageway 25'a. In consequence carriage 32' and coupling 23' are positioned to receive enlargement 18'a when released from coupling 20'a.

While the particular stringing block threading apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. A stringing block threading apparatus comprising:
    an elongated main body provided with a generally tubular open-ended passage having an upwardly flaring hauling line receiving passage extending therealong;
    means at each end of said passage for releasably supporting the respective ends of a stringing block threading loop, one end of said loop being equipped with a male coupling half and the other end thereof being equipped with a female coupling half; and
    means within said passage for automatically detaching a double ended female coupling separably connecting the adjacent ends of the leading contiguous sections of an aerially-transported conductor hauling line as said double-ended coupling is moved toward one end of said passage in said main body thereby releasing said adjacent ends of the said leading hauling line sections and permitting said ends of said hauling line sections to move apart along said passage into coupling engagement with the respective male and female coupling halves of said threading loop.

2. Stringing block threading apparatus as defined in claim 1 characterized in that said means for supporting the coupling means at one end of said threading loop is movable between a retracted position to one side of said tubular passage and an extended position crosswise of said tubular passage, and means for holding said coupling supporting means in said retracted position and including means responsive to the movement of a hauling line coupling along said tubular passage to restore said coupling supporting means to the retracted position thereof.

3. Stringing block threading apparatus as defined in claim 2 characterized in that said automatic means for detaching said double-ended female coupling from a conductor hauling line includes first and second coupling stop means respectively located near the opposite ends of said open-ended passage in said main body, said first stop means being fixed to said main body near the forward end of said passage and said second stop means being carried by said movable means for supporting one end of said threading loop.

4. Stringing block threading apparatus as defined in claim 1 characterized in that said double-ended female coupling for separably interconnecting the leading sections of a conductor hauling line comprises an elongated cylindrical housing normally embracing the adjacent ends of the hauling line sections in the opposite ends thereof, separate means carried by said coupling to lock said hauling line sections to a respective end of said coupling and including actuator means at the opposite ends of said coupling engageable with a respective one of said first and second stop means to release said hauling line sections in sequence when said coupling is shifted forwardly and backwardly along said open ended passage.

5. Stringing block threading apparatus as defined in claim 1 characterized in that said means for supporting said coupling means at one end of the threading loop is slidably supported crosswise of said tubular passage adjacent one end thereof, means for holding said coupling support means in a retracted position to one side of said passage until said hauling line coupling enters said tubular passage and being responsive to movement of said coupling therealong to restore said coupling support means crosswise of said tubular passage and in position for coupling engagement with one released end of said hauling line.

6. Stringing block threading apparatus as defined in claim 1 characterized in that the coupling means at one end of said threading loop is similar to the double-ended female coupling released from a conductor hauling line by said threading apparatus.

7. Stringing block threading apparatus for substituting a threading loop for a coupling interconnecting leading sections of a conductor hauling line, said apparatus comprising:
an elongated main body having an open-ended slotted passage;
a threading loop insertable through a stringing block having a first coupling fixed to one end thereof and a second coupling detachably coupled to the other end thereof;
said main body having means for releasably supporting said first and second couplings adjacent a respective end of said passage in position to seat a respective end of a conductor hauling line when said ends are released from a line coupling interconnecting the same; and
said threading apparatus having means for releasing a hauling line coupling from the hauling line and retaining the same captive in said passage thereby permitting the uncoupled ends of the hauling line to move apart and into seating engagement with a respective one of said first and second couplings thereby substituting said threading loop for said line coupling.

8. Stringing block threading apparatus as defined in claim 7 characterized in that said second coupling and said hauling line coupling are interchangeable.

9. Stringing block threading apparatus as defined in claim 7 characterized in that said second coupling includes means for quickly releasing the same from said threading loop and from said hauling line.

10. Stringing block threading apparatus as defined in claim 7 characterized in that said second coupling includes means for releasing the same from said threading loop and from said hauling line in time delayed sequence.

11. Stringing block threading apparatus as defined in claim 7 characterized in that said line coupling comprises a tubular main body provided with separate retractable detent means operable to hold a respective hauling line coupling member against withdrawal from the opposite ends of said coupling and including means normally locking said coupling members positively against withdrawal from said main body.

12. Stringing block threading apparatus as defined in claim 11 characterized in that said detent locking means is exposed at the end of said main body for engagement with means carried by said apparatus to actuate said detent means and release said coupling members for withdrawal from said tubular main body.

13. Stringing block threading apparatus as defined in claim 7 characterized in that said first coupling comprises an elongated member having one end fixedly secured to one end of said threading loop, the other end of said elongated member having a cavity slotted lengthwise of said elongated member and including a passage in free communication therewith and opening laterally of the midportion of said coupling, said passage being sized to freely receive the enlarged end of the hauling line section and said slot freely passing the hauling line while holding captive the enlarged end thereof when the hauling line extends generally lengthwise of said elongated coupling.

14. Stringing block threading apparatus as defined in claim 13 characterized in that said support means for said first coupling supports the same crosswise of one end of said slotted passage and in position to receive and retain captive the enlarged end of a hauling line section.

15. Stringing block threading apparatus as defined in claim 14 characterized in the provision of means movably mounting said first coupling support means for movement from a retracted position to one side of said slotted passage until a hauling line coupling has been introduced thereinto and including means responsive to the presence thereof to shift said coupling support means across the end of said slotted passage.

16. An automatically releasable coupling for interconnecting adjacent sections of a conductor hauling line for the insertion of a stringing block threading loop between said adjacent sections, said coupling having a tubular main body adapted to loosely receive the enlarged ends of adjacent sections of a conductor hauling line in the opposite ends thereof, separate detent means for each of said enlarged ends including spring-biased locking pin means reciprocably supported lengthwise of said main body and actuatable from the end thereof, said locking pin means being normally positioned to lock the enlarged ends of the adjacent sections of a conductor hauling line assembled within said main body and being movable when pressed inwardly from the end thereof to a position permitting said detent means to release said enlarged hauling line ends for withdrawal from the ends of said main body.

17. A releasable coupling as defined in claim 16 characterized in that said locking pin means is operable to release one of said enlarged hauling line ends before releasing the other enlarged end.

18. A releasable coupling as defined in claim 16 characterized in that said main body has a passage opening through the sidewall and one end thereof shaped and sized to receive the lateral insertion of the enlarged end portion of a hauling line.

19. A releasable coupling as defined in claim 18 characterized in that said passage includes a radially disposed slot merging with a tubular passage inclined acutely to the axis of said main body.

20. A releasable coupling as defined in claim 16 characterized in that said locking pin means comprises separate pins projecting from the opposite ends of said main body each spring-biased to an extended position axially away from one another to lock an associated one of said detent means against movement, and each of said pin means being operable independently of the other to release the associated one of said detent means.

21. A releasable coupling as defined in claim 16 characterized in that said locking pin means includes at least one pair of pins reciprocable independently of one another lengthwise of said main body and spring-biased toward a respective end thereof and operable to lock an associated one of said detent means against movement, and said pins being movable axially inwardly of the end of said main body independently of the other of said pins thereby to unlock and permit movement of the associated one of said detent means.

22. Stringing block threading apparatus comprising:
an elongated main body having a tubular passage provided with an upwardly flaring conductor hauling line guide passage;
means for releasably supporting first and second coupling means at the opposite ends of a threading loop adjacent the opposite ends of said tubular passage, said first coupling means being fixed to one end of said threading loop and said second coupling means being detachably secured to the other end of said threading loop;
said support for said first coupling means being shiftable between a retracted position to one side of said tubular passage and an extended position wherein said first coupling means lies crosswise of said tubular passage; and
means responsive to the introduction of means attached to a conductor hauling line into said tubular passage to cause said support means for said first coupling to shift from said retracted position to said extended position thereof.

23. Stringing block threading apparatus as defined in claim 22 characterized in the provision of spring means urging said first coupling support means to the extended position thereof, and said means responsive to the introduction of means attached to a conductor hauling line including latch means for holding said coupling support means in said retracted position until engaged by said means attached to a conductor hauling line.

24. Stringing block threading apparatus as defined in claim 22 characterized in the provision of grooved guide roller means supported in alignment with one end of said main body adjacent said first coupling of said threading loop with the axis of the tubular passage of said main body generally tangent to the upwardly facing bottom of said grooved roller means.

25. Stringing block threading apparatus defined in claim 24 characterized in that said first coupling means is positioned between said guide roller means and the adjacent end of said tubular passage in said main body.

26. Stringing block threading apparatus comprising:
an elongated main body having an open-ended tubular passage provided with an upwardly flaring open-ended conductor hauling line guide passage;
separate means for releasably supporting first and second coupling means at the opposite ends of a stringing block threading loop adjacent the opposite ends of said tubular passage;
said first coupling means comprising an elongated member having one end connected to one end of said threading loop, the other end of said first coupling means being provided with a slotted socket shaped to receive and captively seat an enlargement fixed to an end portion of a conductor hauling line;
said supporting means for said first coupling means being movable crosswise of the rear end of said tubular passage between a retracted position to one lateral side of said passage and an extended position overlapping the adjacent end of said tubular passage; and
latch means to hold said support means for said first coupling means in said retracted position and including means to release said latch means when a conductor hauling line is present in said tubular passage thereby permitting said coupling support means to return to said extended position with said first coupling means in position for interlocking assembly with the enlargement on a conductor hauling line as the latter exits from the rear end of said tubular passage.

27. Stringing block threading apparatus as defined in claim 26 characterized in that said second coupling means has a generally tubular main body having an open-ended passageway therethrough, a keyhole shaped passage extending lengthwise of said main body and opening laterally through the sidewall thereof with the larger portion of the keyhole inclined acutely to the axis of said main body, means for releasably supporting said second coupling means crosswise of the forward end of said main body with the larger portion of said keyhole passage aligned generally with the axis of said tubular passage and in readiness to receive and retain the enlarged end of a conductor hauling line captive therein; and the opposite end of said second coupling means being held releasably assembled to the leading end of said threading loop.

28. A stringing block threading loop coupling comprising:
an open-ended tubular main body having a threading loop attached to one end thereof;
a keyhole shaped passage opening through the sidewall of said main body, said passage including a tubular portion and a radially disposed slot portion opening through the other end of said main body, said keyhole shaped passage being adapted to receive a flexible line having an enlargement at the end thereof;
detent means captively supported on said main body and including spring-biased actuator means for locking said detent means in position to prevent the withdrawal of said enlargement from the end of said main body; and
said detent actuator means being movable to a position permitting said detent means to retract and release said enlargement and the line attached thereto for axial withdrawal from said other end of said main body.

29. A threading loop coupling as defined in claim 28 characterized in that said threading loop is held releasably coupled to said one end of said main body by detent means normally locking said last mentioned detent means extended and movable to a retracted position permitting the withdrawal of said threading loop from said one end of said main body.

30. A threading loop coupling as defined in claim 28 characterized in that the actuator means for each of said detent means is operable to release said threading loop and said flexible line in predetermined sequence.

31. A threading loop coupling as defined in claim 26 characterized in the provision of separate actuator means for each of said detent means and operable independently of the other to release the detent means associated therewith.

32. A threading loop coupling as defined in claim 31 characterized in that said separate actuator means include spring means biasing the same axially toward a respective end of said main body thereby to lock an associated one of said detent means against movement, and said detent means being freed for movement independently of one another by inward movement of the associated one of said actuator means.

33. Apparatus for utilizing a helicopter to thread a hauling line in succession through a series of continuous frames which apparatus is securable atop successive towers of a power line comprising;
    a conductor hauling line attachable to a helicopter for deployment along the powerline and including a double ended coupling detachably interconnecting the adjacent ends of first and second sections of said hauling line;
    line catching means at each tower including means for automatically disconnecting said coupling from said first and second ends of said hauling line as said coupling is being advanced through said catching means by the helicopter; and
    means at said line catching means for recoupling said disconnected first and second sections of said hauling line to the opposite ends of a threading loop extending through an associated one of said continuous frames.

34. Apparatus as defined in claim 33 characterized in that said line catching means includes an elongated line receiving passage extending lengthwise of the powerline, means adjacent the opposite ends of said line receiving passage to seat a respective end of said threading loop and each of which ends including a respective coupler for automatically engaging a respective end of said first and second sections of said conductor hauling line.

35. Apparatus as defined in claim 33 characterized in that one end of said threading loop is equipped with a double ended coupler of the same type employed to detachably interconnect said first and second sections of said conductor hauling line.

36. Apparatus as defined in claim 34 characterized in that said line catching means includes means engageable with said double ended coupling operable upon engagement therewith to disconnect said first and second sections of said conductor hauling line therefrom in predetermined sequence and allowing said first end to move forwardly and said second end to move rearwardly into coupling engagement with a respective end of said threading loop.

37. Apparatus as defined in claim 33 characterized in that said automatic disconnect means for said coupling includes means for disconnecting the same from said first and second sections of said hauling line in time delayed sequence.

38. Apparatus as defined in claim 33 characterized in that said automatic disconnect means for said coupling includes means for releasing said coupling from said first hauling line section as said coupling advances forwardly within said line catching means, and means for thereafter releasing the said coupling from said second hauling line section as said coupling moves rearwardly within said line catching means.

39. A stringing block threading loop comprising:
    a flexible cable having a female coupling connected to one end thereof and provided with a slotted cavity at the other end thereof adapted to receive and retain captive an enlargement on a forward section of a conductor hauling line; and
    the other end of said flexible cable having an enlargement thereon adapted to be held releasably captive in a quick-release female coupling.

40. A stringing block threading loop as defined in claim 39 characterized in the provision of a quick-release double-ended coupling having one end thereof releasably coupled to said enlargement at said other end of said cable, the other end of said double-ended coupling having means for releasably connecting the same to the enlargement on the end of a leading section of a conductor hauling line.

41. A stringing block threading loop as defined in claim 40 characterized in that said quick-release coupling includes detent actuator means at each end thereof actuatable upon abutment with stop means to release a respective one of said enlargements.

* * * * *